United States Patent
Park

(10) Patent No.: US 9,392,619 B2
(45) Date of Patent: Jul. 12, 2016

(54) APPARATUS AND METHOD FOR IMPROVING CAPABILITY OF WI-FI DURING REBOOT OF AN ACCESS POINT IN WIRELESS COMMUNICATION SYSTEM

(75) Inventor: Youn-Ho Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1135 days.

(21) Appl. No.: 13/188,934

(22) Filed: Jul. 22, 2011

(65) Prior Publication Data
US 2012/0042158 A1 Feb. 16, 2012

(30) Foreign Application Priority Data
Aug. 10, 2010 (KR) .......... 10-2010-0076738

(51) Int. Cl.
| | | |
|---|---|---|
| G06F 9/00 | (2006.01) | |
| G06F 15/177 | (2006.01) | |
| H04W 74/00 | (2009.01) | |
| G06F 9/44 | (2006.01) | |
| H04W 88/08 | (2009.01) | |

(52) U.S. Cl.
CPC ........... *H04W 74/004* (2013.01); *G06F 9/4401* (2013.01); *G06F 9/4406* (2013.01); *H04W 88/08* (2013.01)

(58) Field of Classification Search
CPC ............................. G06F 9/4401; G06F 9/4406
USPC ........................................... 713/1, 2
See application file for complete search history.

(56) References Cited

U.S. PATENT DOCUMENTS

| | | | |
|---|---|---|---|
| 8,381,264 B1* | 2/2013 | Corddry et al. ........... 726/3 |
| 8,572,698 B1* | 10/2013 | Kandasamy ............... 726/5 |
| 2003/0140155 A1* | 7/2003 | Harvey et al. .......... 709/230 |
| 2004/0095942 A1* | 5/2004 | Lung ...................... 370/400 |
| 2006/0041737 A1* | 2/2006 | Kumagai ................. 713/1 |
| 2007/0014231 A1* | 1/2007 | Sivakumar et al. ..... 370/216 |
| 2008/0109880 A1* | 5/2008 | Shiu et al. ............... 726/3 |
| 2008/0232259 A1* | 9/2008 | Thomson ................ 370/242 |
| 2009/0235339 A1* | 9/2009 | Mennes et al. ........... 726/5 |

* cited by examiner

*Primary Examiner* — Phil Nguyen
(74) *Attorney, Agent, or Firm* — Jefferson IP Law, LLP

(57) ABSTRACT

An apparatus and a method for configuring security for connection between a portable terminal supporting a Wireless-Fidelity (Wi-Fi) function and an Access Point (AP) are provided. More particularly, an apparatus and a method are provided for preventing access failure caused by an access request of a portable terminal while an AP of an un-configured mode, which is completing security setup using a Wi-Fi Protected Setup (WPS) function, is rebooted. The apparatus includes an AP for providing a terminal with a time taken to reboot after configuring security information based on a WPS function in an un-configured mode, wherein the terminal sends a request to access the AP after the rebooting has completed by determining the time taken to reboot received from the AP of the un-configured mode.

10 Claims, 5 Drawing Sheets

APPARATUS AND METHOD FOR IMPROVING CAPABILITY OF WI-FI DURING REBOOT OF AN ACCESS POINT IN WIRELESS COMMUNICATION SYSTEM

PRIORITY

This application claims the benefit under 35 U.S.C. §119(a) of an Korean patent application filed in the Korean Intellectual Property Office on Aug. 10, 2010, and assigned Serial No. 10-2010-0076738, the entire disclosure of which is hereby incorporated by reference.

BACKGROUND OF THE INVENTION

1. Field of the Invention

The present invention relates to an apparatus and a method for configuring security for connection between a portable terminal supporting a Wireless-Fidelity (Wi-Fi) function and an Access Point (AP). More particularly, the present invention relates to an apparatus and a method for preventing access failure caused by an access request of a portable terminal when an AP of an un-configured mode completes security setup using a Wi-Fi Protected Setup (WPS) function and is rebooted.

2. Description of the Related Art

Due to rapid technological advancement, portable terminals have become more than a medium for wireless voice communication and information exchange. When portable terminals were first introduced, their portability and wireless communication are what attracted the public. As technology has advanced and since the introduction of wireless Internet, portable terminals are expanding their application from the simple phone call or the schedule management to a game, a remote control using short-range communication, image capturing using an embedded digital camera, and wireless Local Area Network (LAN), thus meeting user's demand.

The wireless LAN function offers a communication service, such as Internet, to portable terminals (e.g., Personal Digital Assistants (PDAs), notebook computers, and other similar devices) within a certain distance from an installed Access Point (AP), which is a wireless access device. Propagation range of the wireless LAN has grown from 10 meters (m) to 50 m and to hundreds of meters in the 2000s. A transfer rate of the wireless LAN has also improved to transmit and receive high-volume multimedia.

To use such a WLAN function, it is necessary to configure security between the portable terminal and the AP.

In the security setup process, a user accesses an AP management page on the web and inputs the name of the wireless network, user channel information, security information, and the like. However, the user mostly feels burdensome in the security setup of the wireless Internet.

To address this problem, a Wireless-Fidelity (Wi-Fi) Protected Setup (WPS) function provided automatically configures the security between the portable terminal and the AP. The WPS function allows the automatic security setup through the user's input button. When the WPS function is executed, the AP communicates with the portable terminal and transmits information required for the security setup to the portable terminal.

The AP can be in an un-configured mode without the security setup, or in a configured mode with the security setup. In the un-configured mode, the AP performs rebooting by taking a certain time to apply security information required for the security setup. That is, the AP can complete the security setup by applying new security information through the rebooting.

The portable terminal receives the security information from the AP and attempts to access the AP. The portable terminal can attempt to access the AP while the AP does not complete the rebooting. However, this access to the AP fails due to the portable terminal being unaware of when the AP has completed rebooting.

Therefore, a need exists for an apparatus and a method for improving connection capability of a portable terminal and an AP in a wireless communication system.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for improving connection capability of a portable terminal and an Access Point (AP) in a wireless communication system.

Another aspect of the present invention is to provide an apparatus and a method of a portable terminal for determining a rebooting time of an AP which executes a Wireless-Fidelity (Wi-Fi) Protected Setup (WPS) function in an un-configured mode.

Yet another aspect of the present invention is to provide an apparatus and a method of a portable terminal for requesting access when an AP of an un-configured mode completes rebooting.

A further aspect of the present invention is to provide an apparatus and a method of an AP of an un-configured mode to provide a portable terminal with a time taken to complete rebooting.

In accordance with an aspect of the present invention, an apparatus for improving Wi-Fi capability in a wireless communication system is provided. The apparatus includes an AP for providing a terminal with a time taken to reboot after configuring security information based on a WPS function in an un-configured mode, wherein the terminal sends a request to access the AP after the rebooting has completed by determining the time taken to reboot received from the AP of the un-configured mode.

In accordance with another aspect of the present invention, an apparatus for improving Wi-Fi capability of an AP is provided. The apparatus includes a WPS executor for providing a terminal with a time taken for the AP of an un-configured mode to reboot after configuring security information based on a WPS function, for configuring the security information based on the WPS function, and for rebooting to change the configured security information.

In accordance with another aspect of the present invention, an apparatus for improving Wi-Fi capability of a terminal is provided. The apparatus includes a WPS executor for determining a time taken to reboot received from an AP of an un-configured mode, for standing by until the rebooting is completed, and for requesting access to the AP after the rebooting has completed.

In accordance with another aspect of the present invention, a method for improving Wi-Fi capability in a wireless communication system is provided. The method includes providing, by an AP, a terminal with a time taken for the AP of an un-configured mode to reboot after configuring security information using a WPS function, and requesting, by the terminal, to access the AP after the rebooting has completed by determining the time taken to reboot received from the AP of the un-configured mode.

In accordance with another aspect of the present invention, a method for improving Wi-Fi capability of an AP is provided.

The method includes providing a terminal with a time taken for the AP of an un-configured mode to reboot after configuring security information, and after configuring the security information, rebooting to change the configured security information.

In accordance with another aspect of the present invention, a method for improving Wi-Fi capability of a terminal is provided. The method includes determining a time taken to reboot received from an AP of an un-configured mode, and standing by until the rebooting is completed, and after the rebooting has completed, requesting access to the AP.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
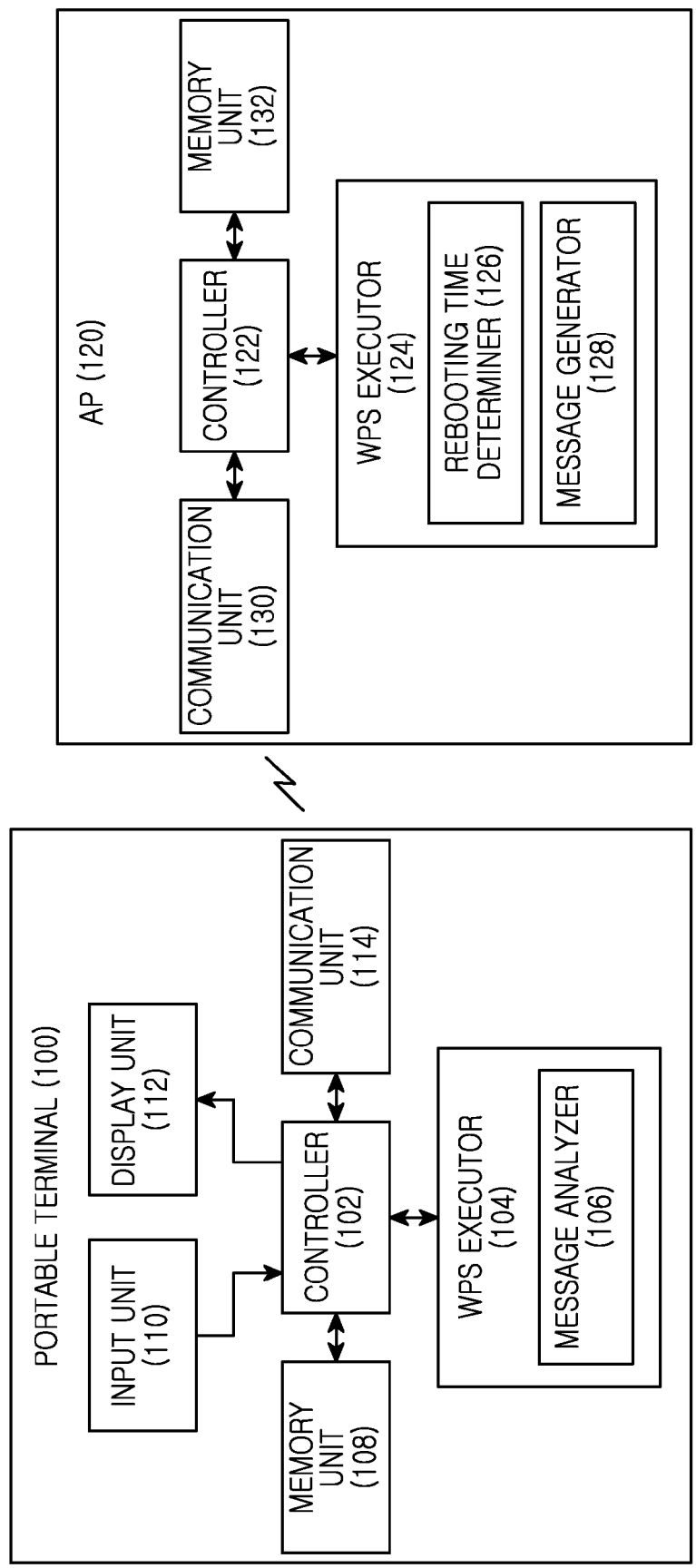
FIG. 1 is a block diagram of a wireless communication system for a Wi-Fi Protected Setup (WPS) connection according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for improving connection capability between a portable terminal and an Access Point (AP) such that the portable terminal requests access when the AP completes rebooting in a wireless communication system. Hereinafter, the AP is assumed to be in an un-configured mode without security setup.

FIGS. 1 through 5, described below, and the various exemplary embodiments of the present invention provided are by way of illustration only and should not be construed in any way that would limit the scope of the present invention. Those skilled in the art will understand that the principles of the present disclosure may be implemented in any suitably arranged communications system. The terms used to describe various exemplary embodiments of the present invention provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a block diagram of a wireless communication system for a Wireless-Fidelity (Wi-Fi) Protected Setup (WPS) connection according to an exemplary embodiment of the present invention.

Referring to FIG. 1, the wireless communication system includes a portable terminal 100 and an AP 120.

The portable terminal 100 includes a controller 102, a WPS executor 104, a memory unit 108, an input unit 110, a display unit 112, and a communication unit 114. The WPS executor 104 can further include a message analyzer 106. The portable terminal may include additional units that are not illustrated here merely for the sake of clarity. Similarly, the functionality of two or more of the above units may be integrated into a single component.

The controller 102 of the portable terminal 100 controls operations of the portable terminal 100. For example, the controller 102 processes and controls voice communication and data communication. In addition to these typical functions, in the WPS connection, the controller 102 processes to analyze a message received from the AP 120 and to determine a rebooting time to apply security setup changed by the AP 120. This is to prevent access failure when the access to the AP 120 is attempted while the AP 120 is rebooted. The controller 102 processes to access the AP 120 when the AP 120 completes the rebooting.

Under control of the controller 102, the WPS executor 104 processes the WPS connection with the AP 120. That is, when detecting an input for the WPS function, the WPS executor 104 searches for the AP 120, sends a probe request to the AP 120 to connect, receives a response of the request from the AP 120, and processes to change the setup with security information received from the AP 120.

After determining the time taken for the AP 120 sending the security information to complete the rebooting, the WPS executor 104 processes to attempt to access the AP 120 when the rebooting is completed. In so doing, the time taken for the AP 120 to complete the rebooting can be included to the response message sent from the AP 120 in response to the WPS probe request.

The message analyzer 106 of the WPS executor 104, upon receiving the response message from the AP 120 in response to the WPS probe request, determines the time taken for the AP 120 to complete the rebooting by analyzing the response message.

The memory unit 108 includes a Read Only Memory (ROM), a Random Access Memory (RAM), a flash ROM, or other similar storage devices. The ROM stores microcodes and reference data of a program for processing and controlling the controller 102 and the WPS executor 104.

The RAM, which is the working memory of the controller 102, stores temporary data generated during the program execution. The flash ROM contains updatable data, such as a phonebook, outgoing messages, incoming messages, and the like.

The input unit 110 includes a plurality of function keys, such as number keys 0~9, a menu key, a cancel key, an OK key, a call key, an end key, an Internet access key, navigation keys (or direction keys), character input keys, and other similar input keys and buttons. The input unit 110 provides the controller 102 with key input data corresponding to the key pressed by the user. Moreover, the input unit 110 can generate the key input data for the probe request to the AP and the WPS probe request.

The display unit 112 displays status information, characters, videos, and still images during the operation of the portable terminal 100. The display unit 112 can employ a color Liquid Crystal Display (LCD), an Active Mode Organic Light Emitting Diode (AMOLED) display, and other similar display apparatuses. When the display unit 112 includes a touch input device and is applied to a touch-type portable terminal 100, the display unit 112 can be used as the input device.

The communication unit 114 processes to transmit and receive radio signals of data input and output via an antenna (not illustrated). For instance, in the transmission, the communication unit 114 channel-encodes, spreads, Radio Frequency (RF)-processes, and transmits data. In the reception, the communication unit 114 converts the received RF signal into a baseband signal and restores the data by de-spreading and channel-decoding the baseband signal. Moreover, the communication unit 114 can include a wireless Local Area Network (LAN) module for communicating with the AP. With the wireless LAN module, the communication unit 114 receives the message including the security information for the WPS function and the rebooting time of the AP.

While the controller 102 of the portable terminal 100 can serve as the WPS executor 104 of the portable terminal 100, they are separately illustrated here to distinguish various exemplary functions of the present invention, not to limit the scope of the present invention. One skilled in the art should understand that various modifications can be made without departing from the spirit and scope of the present invention. For example, the controller 102 can process all of the functions of the WPS executor 104.

The AP 120 includes a controller 122, a WPS executor 124, a communication unit 130, and a memory unit 132. The WPS executor 124 can further include a rebooting time determiner 126 and a message generator 128.

The controller 122 of the AP 120 controls the access of the terminal which is to access the AP 120. When connected to the terminal using the WPS function, the controller 122 changes the security information and processes to apply the changed security information through the rebooting. In so doing, the controller 122 of the AP 120 processes to block the terminal from generating the access request before the rebooting has completed.

Under control of the controller 122, the WPS executor 124 processes the WPS connection with the terminal. That is, when detecting the input for the WPS function, the WPS executor 124 outputs a beacon to inform of its existence. When receiving the probe request from the terminal, the WPS executor 124 sends a response message for the received request. In addition, the WPS executor 124 generates the security information for the access with the terminal, changes (configures) its security information with the generated security information, and transmits the generated security information to the terminal.

In so doing, the WPS executor 124 processes to provide the terminal with the rebooting time to apply the security information changed by the AP 120.

The rebooting time determiner 126 of the WPS executor 124 determines the time taken to complete the rebooting when the security information of the AP 120 is changed. The rebooting time varies according to a manufacturer or a product.

The message generator 128 of the WPS executor 124 generates a message required to connect to the terminal. More particularly, the message generator 128 generates the message including the rebooting time determined by the rebooting time determiner 126. The message generator 128 can include the rebooting time into the response message for the WPS probe request received from the terminal.

The communication unit 130 sends a beacon signal to inform of its existence, and sends a request to the terminal for the WPS connection and a response message corresponding to the request. Herein, the response message includes the rebooting time of the AP.

The memory unit 132 stores microcodes and reference data of a program for processing and controlling the controller 122 and the WPS executor 124.

While the controller 122 of the AP 120 can serve as the WPS executor 124 of the AP 120, they are separately illustrated here to distinguish various exemplary functions of the present invention, not to limit the scope of the present invention. One skilled in the art should understand that various modifications can be made without departing from the spirit and scope of the present invention. For example, the controller 122 can process all of the functions of the WPS executor 124.

Figure 2:
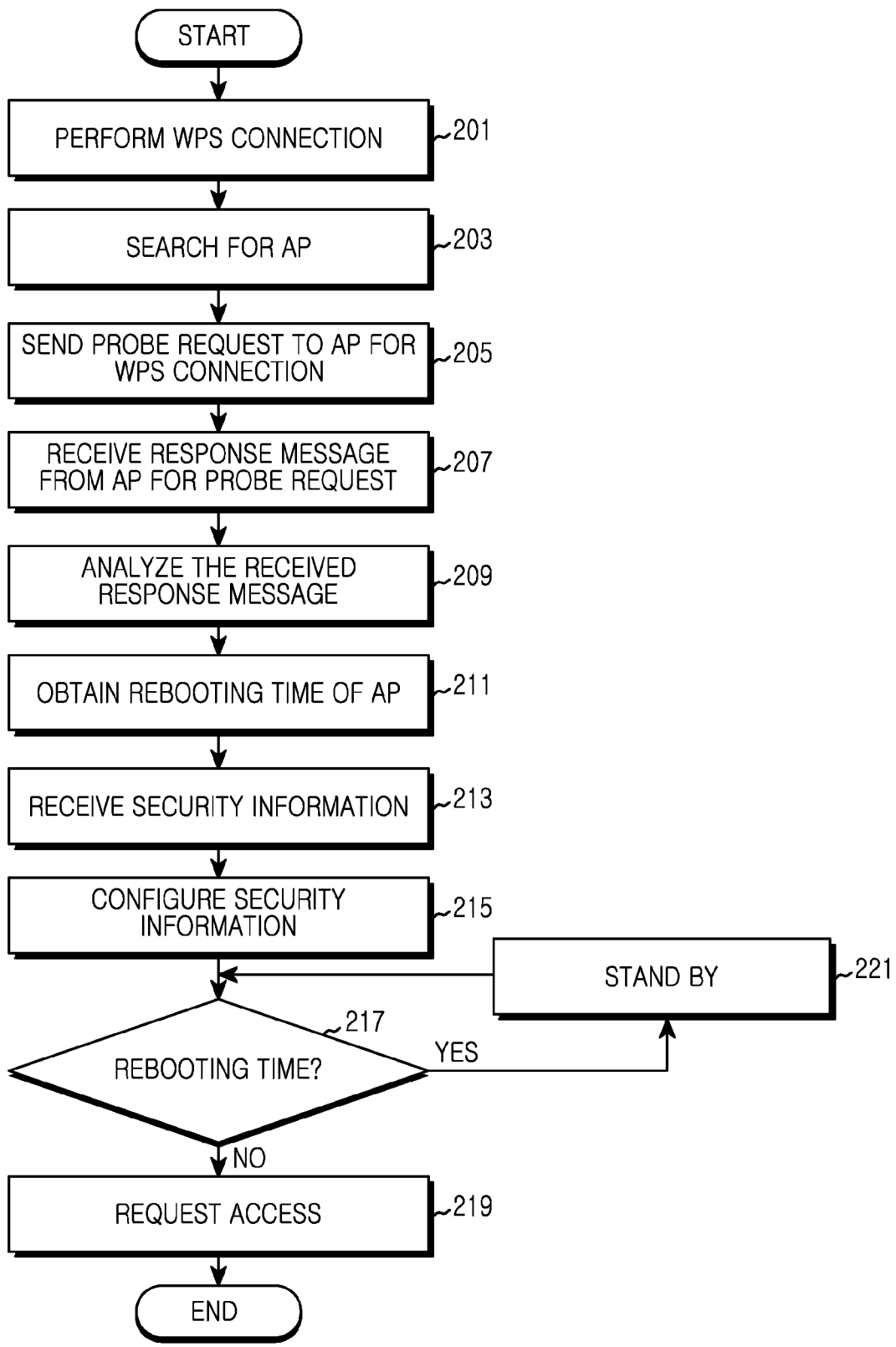
FIG. 2 is a flowchart of a method for a WPS function in a portable terminal according to an exemplary embodiment of the present invention.

FIG. 2 is a flowchart of a method for a WPS function in a portable terminal according to an exemplary embodiment of the present invention.

Referring to FIG. 2, the portable terminal performs the WPS connection in step 201.

Herein, the WPS connection implies that the user inputs a button to run an authentication program using a standard method of the industry to allow users to apply encryption security rapidly and easily to a network Wi-Fi device.

In step 203, the portable terminal searches for the AP which supports the WPS function, and in step 205, transmits the probe request by sending a probe request to the AP found in step 203.

In step 207, the portable terminal receives the response message for the probe request from the AP. Herein, the response message is a probe response in response to the probe request and includes rebooting time information of the AP. The rebooting time of the AP is the amount of time taken from when the rebooting began to when the rebooting completed after the WPS connection, and is used to prevent the access failure according to the access request of the portable terminal before the rebooting has completed.

The portable terminal analyzes the received response message in step 209, and obtains the rebooting time of the AP in the response message in step 211.

Thereafter, the portable terminal receives the security information generated by the AP in step 213, and prepares for the access to the AP by configuring the security information received from the AP in step 215. In so doing, the AP performs the rebooting after transmitting the security information. A portable terminal that is unaware of when the AP will complete rebooting, may request the access to the AP before the rebooting has completed. When this situation occurs, the connection between the portable terminal and the AP fails.

To address this problem, the portable terminal determines the rebooting time of the AP obtained in step 211, in step 217.

If the ongoing rebooting time of the AP is determined in step 217, the portable terminal stands by in step 221 and goes to step 217. That is, the portable terminal stands by without requesting the access to the AP until the AP completes the rebooting.

In contrast, if the completion time of the rebooting of the AP is determined in step 217, the portable terminal requests the access to the AP and connects with the AP in step 219.

Next, the portable terminal completes this process.

Figure 3:
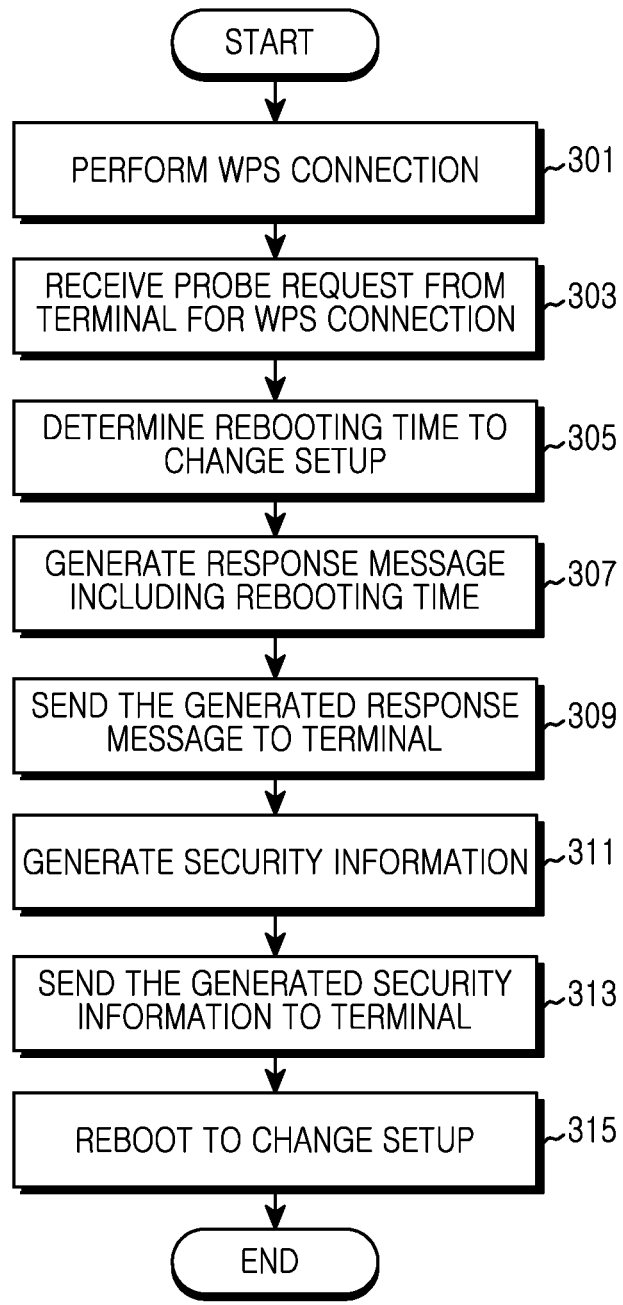
FIG. 3 is a flowchart of a method for a WPS function in an Access Point (AP) according to an exemplary embodiment of the present invention.

FIG. 3 is a flowchart of a method for a WPS function in an AP according to an exemplary embodiment of the present invention.

Referring to FIG. 3, the AP performs the WPS connection in step 301. Herein, as stated above, the WPS connection implies that the user inputs the button to run the authentication program using the standard method of the industry to allow users to apply encryption security rapidly and easily to the network Wi-Fi device.

Thereafter, the AP receives the probe request from the portable terminal for the WPS connection in step 303, and determines the rebooting time for the setup change of the AP in step 305. Herein, the rebooting time indicates the completion time of the rebooting after the WPS connection with the portable terminal.

In step 307, the AP generates the response message including the information of the determined rebooting time of the AP. Herein, the response message is a message permitting the WPS probe request of the portable terminal. The response message includes the rebooting time of the AP to prevent the access request of the portable terminal during the rebooting after the AP completes the WPS setup.

In step 309, the AP transmits the response message generated in step 307 to the portable terminal, and generates the security information for the connection with the portable terminal in step 311.

In step 313, the AP transmits the security information generated in step 311 to the portable terminal and configures the security information for the WPS connection with the portable terminal.

In step 315, the AP reboots to apply the configured security information.

Since the AP transmitted the amount of time taken to complete the rebooting to the portable terminal, the portable terminal does not send the access request until the AP completes the rebooting.

Next, the AP completes this process.

Figure 4:
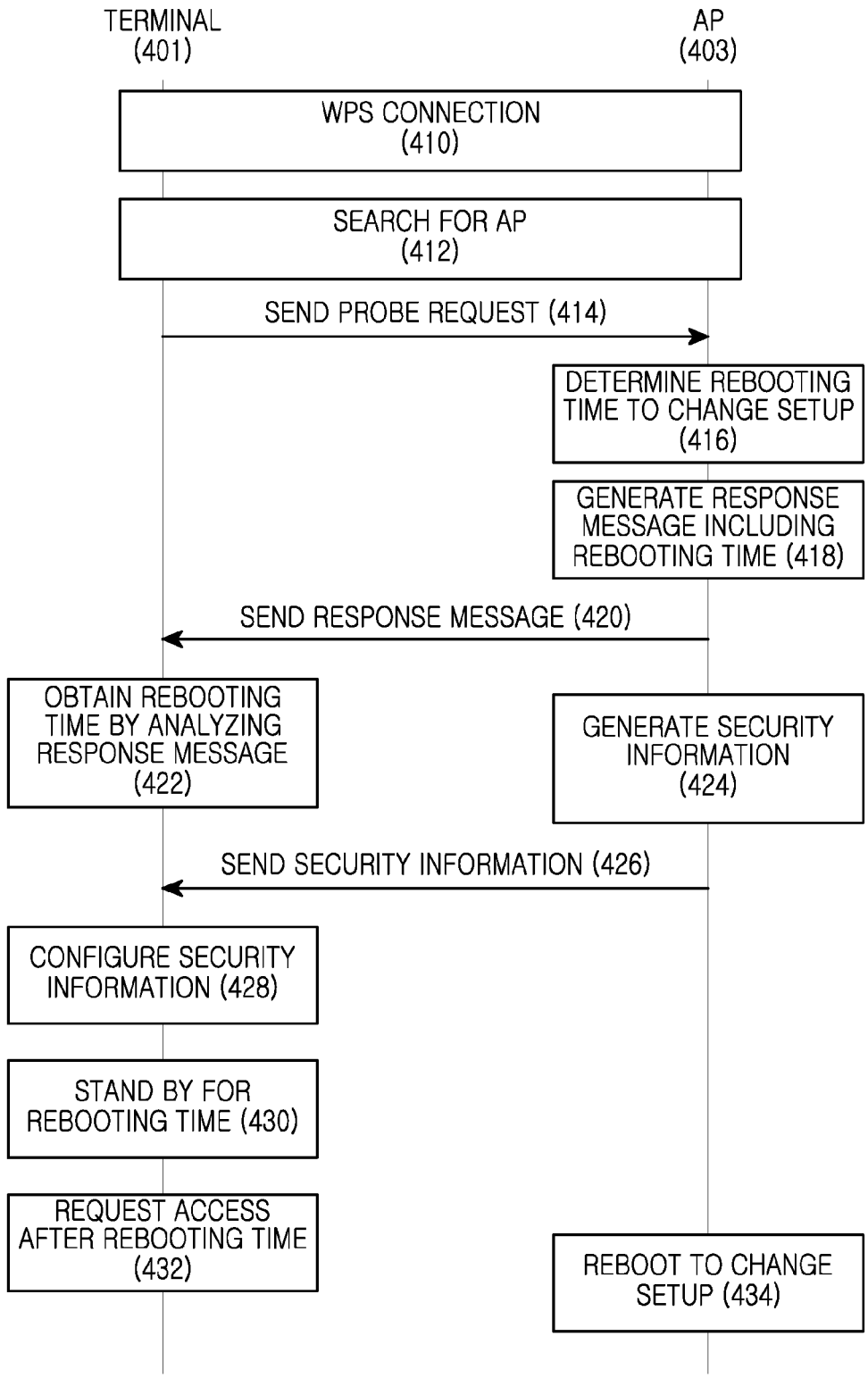
FIG. 4 is a flowchart of a method for a WPS function in a wireless communication system according to an exemplary embodiment of the present invention.

FIG. 4 is a flowchart of a method for a WPS function in a wireless communication system according to an exemplary embodiment of the present invention.

Referring to FIG. 4, the wireless communication system can include a terminal 401 and an AP 403.

The terminal 401 and the AP 403 conduct the WPS connection in step 401 when the buttons are input, and search for the AP in step 412. Herein, the searching for the AP 403 is the process where the terminal 401 detects the beacon informing of the existence of the AP 403 from the AP 403 and selects the AP 403 for the WPS connection.

The terminal 401, upon selecting the AP 403 for the WPS connection, transmits the WPS probe request to the AP 403 in step 414.

In step 416, the AP 403 receiving the WPS probe request determines the completion time of the rebooting which is conducted to change the setup after the WPS connection.

This is to prevent the access request of the terminal 401 during the rebooting of the AP 403 by informing the terminal 401 of the time taken to complete the rebooting.

In step 418, the AP 403 generates the response message, including the information of the determined rebooting time, for the WPS probe request.

After generating the response message including the rebooting time information as above, the AP 403 sends the generated response message to the terminal 401 in step 420 so as to block the access request of the terminal 401 during the rebooting.

For doing so, the terminal 401 determines the rebooting time of the AP 403 for the WPS connection by analyzing the received response message in step 422.

The AP 403 generates the security information to connect with the terminal 401 in step 424, changes the setup information for the connection with the terminal 401, and reboots to apply the changed setup information in step 434. In addition, in step 426, the AP 403 transmits the generated security information to the terminal 401.

The terminal 401 receiving the security information configures the security information using the received security information in step 428, determines the pre-stored rebooting time, and stands by without the access request until the AP 403 completes the rebooting in step 430.

Thereafter, when determining the completion time of the rebooting of the AP 403, the terminal 401 requests the access to the AP 403 in step 432 and processes to connect to the AP 403.

Figure 5:
FIG. 5 is a diagram of a message including a rebooting time according to an exemplary embodiment of the present invention.

FIG. 5 is a diagram of a message including a rebooting time according to an exemplary embodiment of the present invention.

Referring to FIG. 5, the message can use the probe response sent from the terminal in response to the WPS probe request.

The response message includes an item 501 indicating the AP supporting the WPS function, and an item 503 indicating the information of the time taken for the AP supporting the WPS function to reboot after changing the security information as shown in FIG. 5.

Hence, the terminal, to access the AP supporting the WPS, determines the time taken for the AP to reboot and blocks the access request until the AP completes the rebooting. This is to avoid the access failure when the portable terminal of the related art, which is unaware of when the AP will complete the rebooting, requests the access to the AP before the rebooting has completed.

As set forth above, using the rebooting time of the AP, the portable terminal stands by during the rebooting of the AP and requests to access the AP when the AP completes the rebooting. Therefore, the connection capability between the portable terminal and the AP can be improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal for improving a Wireless-Fidelity (Wi-Fi) capability, the portable terminal comprising:
   a communication unit configured to communicate with an Access Point (AP); and
   a controller configured to:
      control the communication unit to transmit a request for configuring security information to an Access Point (AP) and to receive a response message corresponds the request from the AP, the response message comprising an amount of time taken to complete a rebooting of the AP and a security information for a Wi-Fi Protected Setup (WPS) function,
      determine a completion time of the rebooting of the AP by analyzing the response message,
      based on the determination, control the communication unit to skip an access process to the AP until the AP completes the rebooting, and
      based on the determination, control the communication unit to perform the access process to the AP after the reboot of the AP is completed.

2. The portable terminal of claim 1, wherein, when controlling the communication unit to skip the access process to the AP until the AP completes the rebooting, the controller is further configured:
   to wait without requesting the access to the AP until the AP completes the rebooting, and
   to request, if the AP completes the rebooting, the access to the AP and to connect with the AP.

3. The portable terminal of claim 1, wherein the response message comprising the time taken to reboot is received in response to configuring the security information based on the WPS function in an un-configured mode.

4. The portable terminal of claim 1, wherein the response message comprising the time taken to reboot includes a probe response.

5. The portable terminal of claim 1, wherein the AP performs the reboot process in response to transmitting the response message.

6. A method for improving a Wireless-Fidelity (Wi-Fi) capability in a wireless communication system, the method comprising:
   transmitting a request for configuring security information to an Access Point (AP) and receiving a response message corresponds the request from the AP, the response message comprising an amount of time taken to complete a rebooting of the AP and a security information for a Wi-Fi Protected Setup (WPS) function;
   determining a completion time of the rebooting of the AP by analyzing the response message;
   skipping, based on the determination, an access process to the AP until the AP completes the rebooting; and
   performing, based on the determination, perform the access process to the AP after the reboot of the AP is completed.

7. The method of claim 6, wherein the skipping of the access process to the AP until the AP completes the rebooting comprises:
   waiting without requesting the access to the AP until the AP completes the rebooting; and
   requesting the access to the AP and connects with the AP when the AP completes the rebooting.

8. The method of claim 6, wherein the response message is received in response to configuring the security information based on the WPS function in an un-configured mode.

9. The method of claim 6, wherein the response message comprising the time taken to reboot includes a probe response.

10. The method of claim 6, wherein the AP performs the reboot process in response to transmitting the response message.

\* \* \* \* \*